United States Patent
Irvin et al.

(10) Patent No.: US 11,755,775 B2
(45) Date of Patent: Sep. 12, 2023

(54) UPLOAD MANAGEMENT

(71) Applicant: International Business Machines Corporation, Armonk, NY (US)

(72) Inventors: Allison Irvin, West Melbourne (AU); Kimiko Wilson, South Melbourne (AU); Filiz Isabell Kiral, Melbourne (AU); Emily JY Wong, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 16/676,625

(22) Filed: Nov. 7, 2019

(65) Prior Publication Data

US 2021/0141935 A1     May 13, 2021

(51) Int. Cl.
    *G06F 21/62*     (2013.01)
    *G06N 20/00*     (2019.01)
    *G06V 30/196*     (2022.01)
    *G06F 18/214*     (2023.01)
    *G06F 18/2433*     (2023.01)
    *G06V 20/10*     (2022.01)

(52) U.S. Cl.
CPC ...... *G06F 21/6254* (2013.01); *G06F 18/2148* (2023.01); *G06F 18/2433* (2023.01); *G06N 20/00* (2019.01); *G06V 20/10* (2022.01); *G06V 30/1983* (2022.01)

(58) Field of Classification Search
CPC combination set(s) only.
See application file for complete search history.

(56) References Cited

U.S. PATENT DOCUMENTS

| | | | |
|---|---|---|---|
| 9,813,419 | B2 | 11/2017 | Steinberg et al. |
| 10,489,606 | B2 * | 11/2019 | Basavapatna ........... H04L 63/04 |
| 2016/0171242 | A1 | 6/2016 | Basavapatna et al. |
| 2016/0275303 | A1 | 9/2016 | Narayanaswamy et al. |
| 2017/0228289 | A1 | 8/2017 | Akbulut et al. |
| 2019/0075130 | A1 * | 3/2019 | Petry .................... H04L 63/1433 |
| 2019/0268381 | A1 * | 8/2019 | Narayanaswamy .. H04L 63/104 |
| 2020/0042837 | A1 * | 2/2020 | Skinner ................ G06V 10/764 |
| 2021/0051294 | A1 * | 2/2021 | Roedel ................ G06F 21/6245 |

FOREIGN PATENT DOCUMENTS

IN     201741041989 A     5/2019

OTHER PUBLICATIONS

Disclosed Anonymously, "Flexibly Protect Sensitive Resource During Sync to Cloud Server", An IP.com Prior Art Database Technical Disclosure, IP.com No. IPCOM000252268D, Jan. 3, 2018.

(Continued)

*Primary Examiner* — Phung-Hoang J Nguyen
(74) *Attorney, Agent, or Firm* — James L. Olsen (57) ABSTRACT

Aspects of the present disclosure relate to managing the upload of media items to cloud storage. A model can be configured to distinguish between confidential and non-confidential media items. A media item to be uploaded to a cloud storage can be analyzed using the model to determine whether the media item is confidential. In response to determining that the media item is confidential, an upload control action can be issued on the media item.

14 Claims, 6 Drawing Sheets

(56) References Cited

OTHER PUBLICATIONS

Biersdorfer, J.D., "Keeping Your Files Safe in Google's Cloud", Sep. 6, 2017, 3 pages <https://www.nytimes.com/2017/09/06/technology/personaltech/security-google-cloud.html>.

Anonymous, "Flexibly Protect Sensitive Resource During Sync to Cloud Server", An IP.com Prior Art Database Technical Disclosure, IP.com No. IPCOM000252268D, IP.com Electronic Publication Date: Jan. 3, 2018, 3 pages.

Mell et al., "The NIST Definition of Cloud Computing", Recommendations of the National Institute of Standards and Technology, Sep. 2011, 7 pages.

* cited by examiner

UPLOAD MANAGEMENT

BACKGROUND

The present disclosure relates generally to the field of cloud storage and, in particular, to managing media items uploaded to the cloud.

SUMMARY

Embodiments of the present disclosure relate to a method, system, and computer program product for managing the upload of media items to cloud storage. A model can be configured to distinguish between confidential and non-confidential media items. A media item to be uploaded to a cloud storage can be analyzed using the model to determine whether the media item is confidential. In response to determining that the media item is confidential, an upload control action can be issued on the media item.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of cloud storage, and more specifically, to managing media uploaded to cloud storage. While the present disclosure is not necessarily limited to such applications, various aspects of the disclosure can be appreciated through a discussion of various examples using this context.

Cloud resources are increasingly utilized for data storage. For example, cloud storage can be used for data back-up, data transfer, or for general data storage. Cloud storage provides flexibility, removing the need for users to physically possess storage devices. Often times, users utilizing cloud storage rely on hardware of external organizations. However, as individuals and entities rely more on the hardware of others for their cloud storage, security concerns arise. For example, classified, confidential, privileged, or otherwise sensitive data can be uploaded to storage owned and/or operated by an entity that may not be authorized to view such data. As such, aspects of the present disclosure recognize the need to manage data uploaded to distributed storage environments where external organizations own, control, operate, or otherwise handle the data stored therein.

Aspects of the present disclosure address the aforementioned complications via an upload management system. The upload management system can include a model configured to distinguish between confidential and non-confidential media items. A media item to be uploaded to a cloud storage can be analyzed using the model to determine whether the media item is confidential. In response to determining that the media item is confidential, an upload control action can be issued on the media item.

Aspects of the present disclosure provide several advantages. First, aspects of the present disclosure can prevent the upload of media items potentially containing sensitive information to storage resources owned, operated, or otherwise managed by an external organization. Further, because the model can be trained using data provided by a user (e.g., an enterprise with an interest in maintaining confidentiality of the data), the criteria that dictate confidentiality can be fine-tuned by the user. This allows users to have improved control over media items permitted to be uploaded to the cloud. This can also decrease the processing time required to classify media items, as the classification model can be constructed based on data it is typically configured to receive.

Figure 1:
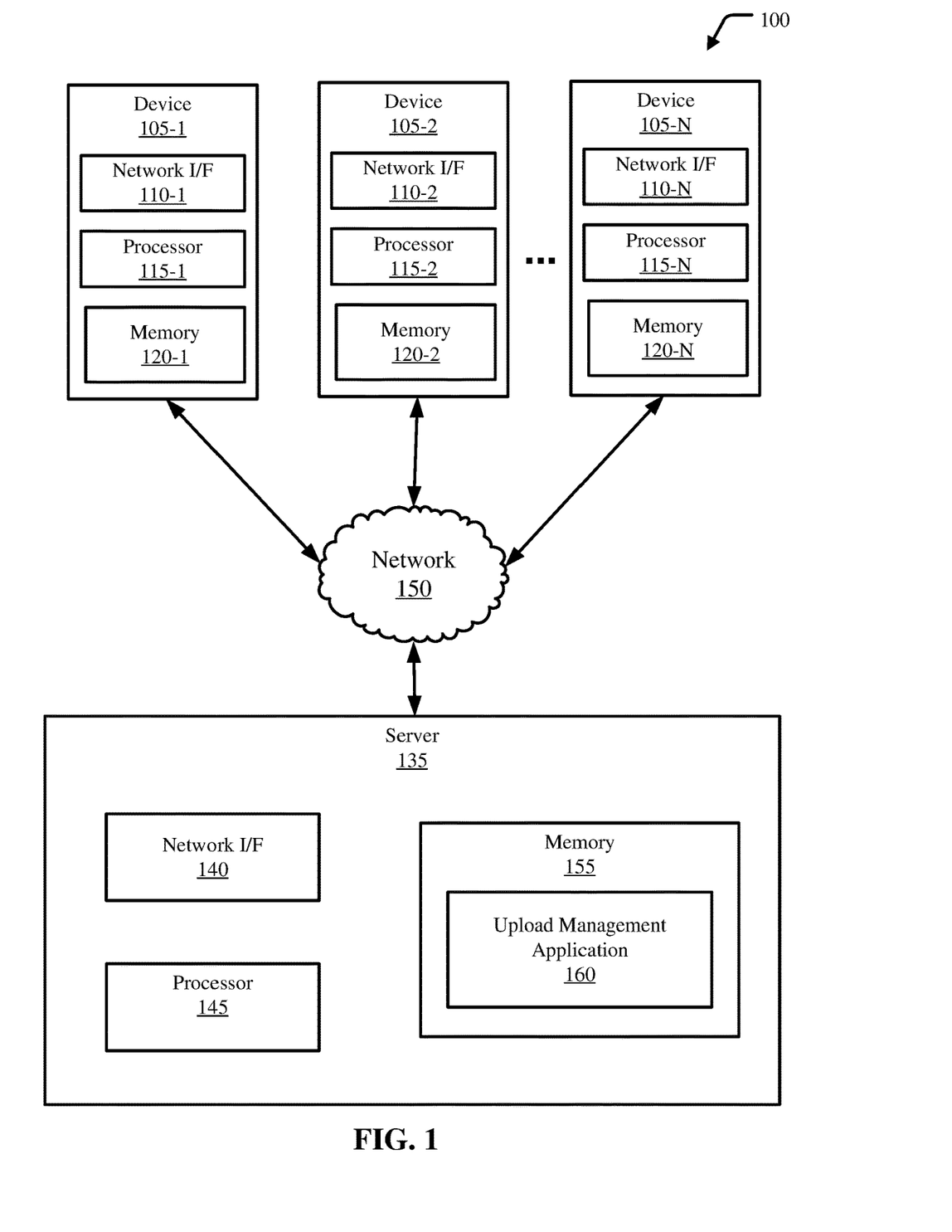
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes an upload management application 160. The upload management application 160 can be configured to manage media items uploaded to a cloud storage (e.g., a distributed storage environment) by the devices 105. The upload management application 160 can include a model configured to distinguish between confidential and non-confidential media items. In embodiments, upon receiving a new media item (e.g., from device 105-1), the media item can be analyzed using the model to determine whether it is confidential or non-confidential. If a determination is made that the media item is confidential, an upload control action can be issued such that the media item is not stored on a cloud storage. If a determination is made that the media item is non-confidential, the media item can be uploaded to cloud storage.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
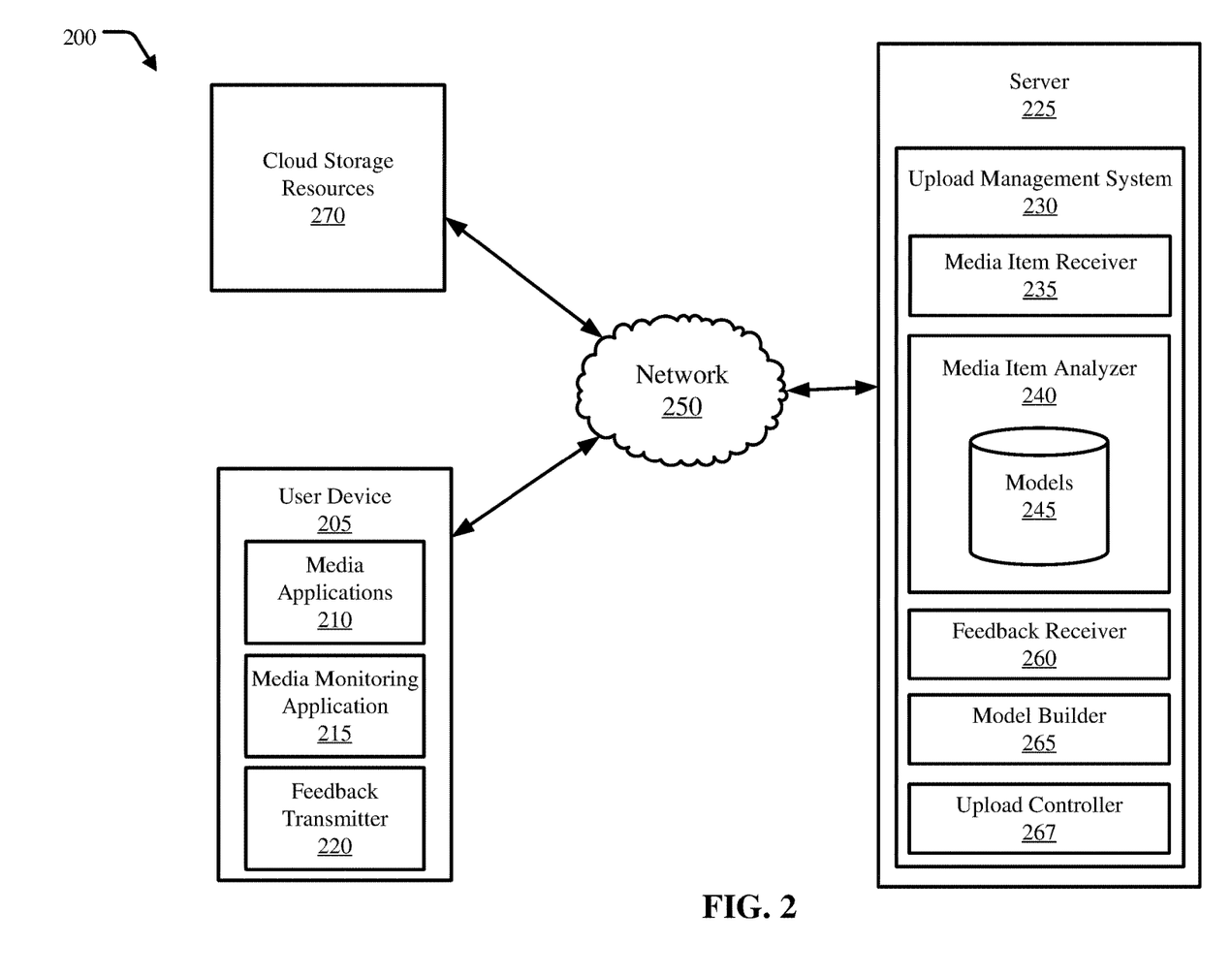
FIG. 2 is a block diagram illustrating an example computing environment including an upload management system, in accordance with embodiments of the present disclosure.

Turning now to FIG. 2, illustrated is a block diagram of an example computing environment 200 in which illustrative embodiments of the present disclosure can be implemented. The computing environment 200 includes a user device 205, a server 225, and cloud storage resources 270. The user device 205, server 225, and cloud storage resources 270 are communicatively coupled through a network 250.

Consistent with various embodiments, the user device 205 includes media applications 210 configured to capture, record, save, receive, generate, or otherwise obtain media items. Media items include media content such as images, videos, audio recordings, documents, files, and the like. The upload of media items to the cloud storage resources 270 can be managed by an upload management system 230 of the server 225. This can be completed to prevent confidential, classified, privileged, or otherwise sensitive data from being uploaded to the cloud storage resources 270.

A media monitoring application 215 can be configured to monitor media items received by the user device 205, and, upon identifying a new media item, transmit the media item to the upload management system 230 of the server 225. The upload management system 230 receives media items by a media item receiver 235. The media item receiver 235 can be configured to receive various structured and unstructured data. In embodiments, data received by the media item receiver 235 can be pre-processed (e.g., formatted, subject to data hygiene protocols, etc.) such that the data can be analyzed by media item analyzer 240.

The media item analyzer 240 analyzes the media item(s) to determine whether they are confidential. Models 245 of the media item analyzer 240 can be trained, programmed, or otherwise configured to differentiate between confidential and non-confidential media items. As discussed herein, "confidential" and "non-confidential" refer to states of media items that dictate whether or not they will be uploaded to cloud storage resources 270 (or whether any other control techniques, such as warnings, queries, etc. will be presented to a user based on the confidentiality classification). In embodiments, determining that a media item is "confidential" can indicate that the media item contains sensitive information not suitable to be stored on external storage (e.g., another organization's hardware). However, determining that a media item is "confidential" does not necessarily mean that the media item does contain confidential, privileged, classified, or otherwise sensitive information, but rather that it is indicated to not be uploaded to the cloud storage resources 270.

As an example, the models 245 may be trained such that media items received from a particular geofence (e.g., a geofence encompassing a datacenter) are always indicated to be confidential and thus not suitable for upload to cloud storage resources 270. In this example, not all media items received from the geofence may actually contain sensitive information. For example, if a user captures a selfie within the geofence, the selfie may not actually contain sensitive information. However, the policy programmed into the models 245 may define such content as confidential regardless of whether the media contains sensitive information.

The models 245 used to determine confidentiality can be programmed, trained, or configured in any suitable manner to control the upload of media items to cloud storage resources 270. In some embodiments, models 245 can include machine learning and/or deep learning algorithms configured to classify the confidentiality of media.

In embodiments, a supervised machine learning model can be implemented to classify the confidentiality of images, documents, audio clips, videos, and the like. The supervised machine learning model can be trained with pre-classified media items. For example, pre-classified (e.g., as "confidential" or "not-confidential") images, videos, audio clips, videos, etc. can be input into the machine learning algorithm such that future media items can be classified. As an example, if all images containing a whiteboard were pre-classified as confidential when training the supervised machine learning model, then the supervised machine learning model can classify future images containing whiteboards as confidential. As another example, if all text documents containing the words "attorney-client privilege" were pre-classified as confidential when training the supervised machine learning model, then the supervised machine learning model can classify future documents containing the words "attorney-client privilege" as confidential.

In some embodiments, the supervised machine learning module can output a probabilistic confidentiality (e.g., a confidentiality score) based on all features (e.g., objects, strings, etc.) within an image. In these embodiments, the probabilistic confidentiality can be compared to a confidentiality threshold to determine whether or not a particular media item is confidential (and thus whether it should be uploaded to the cloud storage resources 270). If the probabilistic confidentiality satisfies the confidentiality threshold, the media item can be uploaded to the cloud, else, the media item can be prevented from being uploaded to the cloud.

In embodiments, features extracted from or identified within media content can be used to determine confidentiality status. For example, objects within images can be blocklisted (e.g., added to a list of prohibited objects, where the presence of a prohibited object indicates confidentiality), such that if a blocklisted object is identified, the image can automatically be classified as confidential. Following the above-example, assuming an object "circuit diagram" is blocklisted, if an object detection algorithm of the media item analyzer 240 detects the object "circuit diagram," then the image containing the circuit diagram can be labeled as confidential. As another example, strings (e.g., words, phrases, etc.) within text documents can be blocklisted. For example, assuming that the words "secret" and "classified" are blocklisted, documents containing the words "secret" and "classified" can be automatically classified as confidential. This can similarly be completed for audio/video data. For example, words within audio snippets can be blocklisted, objects within videos can be blocklisted, etc. such that media items can be classified based on extracted features. In embodiments, identified text within images can also be used to dictate the confidentiality status (e.g., the word "confidential" detected within an image").

In some embodiments, features detected within, extracted from, or otherwise identified within media items can be allowlisted such that the presence of such features indicates a non-confidentiality status. For example, objects within images, words within text, utterances within audio, etc. can be allowlisted such that, if a allowlisted feature is detected, the media content can be classified as non-confidential.

As an example, if the words "sample," "example," "decoy," and "dummy" are allowlisted, any text documents containing the words "sample," "example," "decoy," or "dummy" can be classified as non-confidential. However, the observation of an allowlisted feature may not guarantee a non-confidential classification. For example, other features observed within, or an overall confidentiality score calculated for, media items can override the non-confidentiality indication.

In some embodiments, multiple features (e.g., words within text, objects within images, etc.) detected within a media item can be simultaneously considered to calculate a confidentiality score indicative of confidentiality status. For example, the detection of a first object can increase a confidentiality score (e.g., decrease the likelihood that the media item is uploaded to the cloud storage resources 270) while the detection of a second object can decrease the confidentiality score (e.g., increase the likelihood that the media item is uploaded to the cloud storage resources 270). The calculated confidentiality score can then be compared to a confidentiality threshold to determine whether or not to upload the media item to the cloud storage resources 270.

As an example, assume that a confidentiality threshold is defined as 0.75, such that any media item with a confidentiality score below 0.75 is allowed to be uploaded to the cloud storage resources 270 and any media item with a confidentiality score above 0.75 is prohibited from being uploaded to the cloud storage resources 270. Further assume that an image contains three objects: a whiteboard with text, a blank whiteboard, and a computer screen with a text document open. In this example, the detection of the whiteboard with text can lead to an increase of the confidentiality score by 0.50, the detection of the blank whiteboard can lead to a decrease of the confidentiality score by 0.25, and the detection of the computer screen with the text document open can lead to an increase of the confidentiality score by 0.60. In this example, the confidentiality score can be calculated as a summation of the three feature impact scores, leading to a confidentiality score of 0.85. Because the confidentiality score of 0.85 exceeds the confidentiality threshold of 0.75 (e.g., the confidentiality score does not satisfy the confidentiality threshold), the image containing the whiteboard with text, blank whiteboard, and computer screen with a text document open can be prevented from being uploaded to the cloud storage resources 270.

However, in some embodiments, the highest confidentiality score of all objects within a media item dictates the confidentiality score. For example, following the example above, the computer screen with the text document open (0.60) can dictate the confidentiality score. In this example, the confidentiality score (0.60) would fall below the confidentiality threshold (0.75).

Though the above example depicts a confidentiality score that is calculated by adding respective confidentiality factors, any suitable algorithm can be used to calculate a confidentiality score based on multiple confidentiality factors. For example, in some embodiments, each confidentiality factor can be weighted, and the confidentiality score can be calculated based on the summation of the weighted confidentiality factors.

Any suitable algorithms can be used to detect, extract, or otherwise identify features within media content. Object detection algorithms, such as Viola-Jones object detection, scale-invariant feature transform (SIFT), histogram of oriented gradients (HOG), region based convolutional neural networks (R-CNN), single shot multibox detector (SSD) and you only look once (YOLO) can be implemented to identify objects within images. String-searching algorithms, such as Naïve string-search, Rabin-Karp, Knuth-Morris-Pratt, and Boyer-Moore can be used to search for text within documents. In embodiments, speech recognition algorithms, such as those including hidden Markov models (HMMs), dynamic time warping (DTW) and neural networks can be configured to analyze audio data of audio snippets and videos. In some embodiments, audio can be converted into text and thereafter analyzed using text processing algorithms (e.g., natural language processing software).

In embodiments, locations (e.g., sets of coordinates or geofences) can be used to classify confidentiality by the models 245 of the media item analyzer 240. For example, particular locations can be designated as confidential or non-confidential. Media content captured, generated, received, or otherwise obtained from such locations can be classified according to the designation. In embodiments, global positioning system (GPS) technology can be used to identify where media content items originate from as well as the coordinates and/or geofences of classified locations. In some embodiments, Wi-Fi network data can be used to identify where media content items originate from (e.g., by referencing received signal strength indicator (RSSI) data between a device and multiple Wi-Fi access points). As an example, if a first geofence is defined as confidential, any content obtained from the first geofence can be automatically defined as confidential. This can be completed by defining a geofence, setting a confidentiality classification for the geofence, and ascertaining that a media item was captured within the geofence (e.g., by referencing GPS data).

In embodiments, multiple factors indicative of confidentiality status (e.g., a location where a media item was obtained, a machine learning or deep learning based classification of a media item, features identified within a media item, etc.) can be simultaneously considered by the models 245 of the media item analyzer 240. For example, a confidentiality score can be calculated based on multiple confidentiality factors and the confidentiality score can be compared to a confidentiality threshold to determine whether or not a particular media item is permitted to be uploaded to the cloud storage resources 270. The confidentiality score can be calculated according to a formula: Confidentiality score=$factor_1 \times weight_1 + factor_2 \times weight_2 \ldots + factor_n \times weight_n$.

As an example, assume that a supervised machine learning model outputs a first confidentiality factor of 0.75 for a first media item, assume that a second confidentiality factor of 0.50 is determined based on features extracted from the first media item, and assume that a third confidentiality factor of 0.00 is calculated based on a location of the first media item. In this example, if the first confidentiality factor is weighted at 0.25, the second confidentiality factor is weighted at 0.60, and the third confidentiality factor is weighted at 0.15, then the confidentiality score would be calculated as: (0.75×0.25)+(0.50×0.60)+(0.00×0.15)=0.49. In this example, if a confidentiality threshold is defined as 0.50 (where any confidentiality score below 0.50 indicates that a media item is permitted to be uploaded to the cloud storage resources 270), then the first media item can be uploaded to the cloud storage resources 270.

In embodiments, if the media item analyzer 240 is unable to classify a media item as confidential or non-confidential (e.g., due to insufficient programming of the models 245), then the media item analyzer 240 can prompt the user device 205 to provide feedback. The feedback receiver 260 can be then configured to receive feedback from the feedback transmitter 220 of the user device 205. In embodiments, the feedback received from the user device 205 includes a classification of "confidential" or "non-confidential." However, feedback can be received in any other suitable manner, such as through an I/O device (e.g., a mouse or keyboard) communicatively coupled to the server 225, over a wireless channel, etc.

Upon receiving feedback, a model builder 265 can be configured to update the models 245 based on the received feedback. For example, a supervised machine learning model can be updated based on new training data, a new geofence classification can be updated, feature identification/extraction algorithms can be updated, etc.

Based on the classification output by the media item analyzer 240 or the feedback received at the feedback receiver 260, an upload controller 267 can be configured to manage the upload of the media item to the cloud storage resources 270.

If a confidential classification is determined, then the upload controller 267 can be configured to issue an upload control action on the media item. In embodiments, an administrator of the upload management system 230 can set policies dictating the control to be applied to media items by the upload controller 267. Control applied to media items (e.g., upload control actions) includes, but is not limited to, issuing warnings, confirming upload of media items to cloud storage resources 270 (e.g., "This media item may contain confidential information, are you sure you want to upload it to cloud storage?"), preventing upload of media items to cloud storage resources 270, advising a user to delete a media item based on a confidential classification (e.g., "This media item may contain sensitive information, do you want to delete this media item?"), automatically deleting a media item based on a confidential classification, transmitting the media item to an administrator for review (e.g., a security expert), querying a user whether they want to transmit the media item to an administrator for review (e.g., "This media item may contain classified information, do you want this media item to be reviewed by a security expert?"), and redacting media items (e.g., censoring confidential content within media items).

If a non-confidential classification is output, then the media item can be uploaded to the cloud storage resources by the upload controller 267. In some embodiments, a notification can be transmitted to a user regarding the classification. In some embodiments, a query can be transmitted to the user confirming that they desire to upload the media item to cloud storage resources 270 prior to upload.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary. For example, in embodiments, aspects of the upload management system 230 (e.g., media item analyzer 240 and models 245) can be located on user device 205. This can provide a user of the user device 205 an opportunity to opt out of classification of media items if desired.

Figure 3:
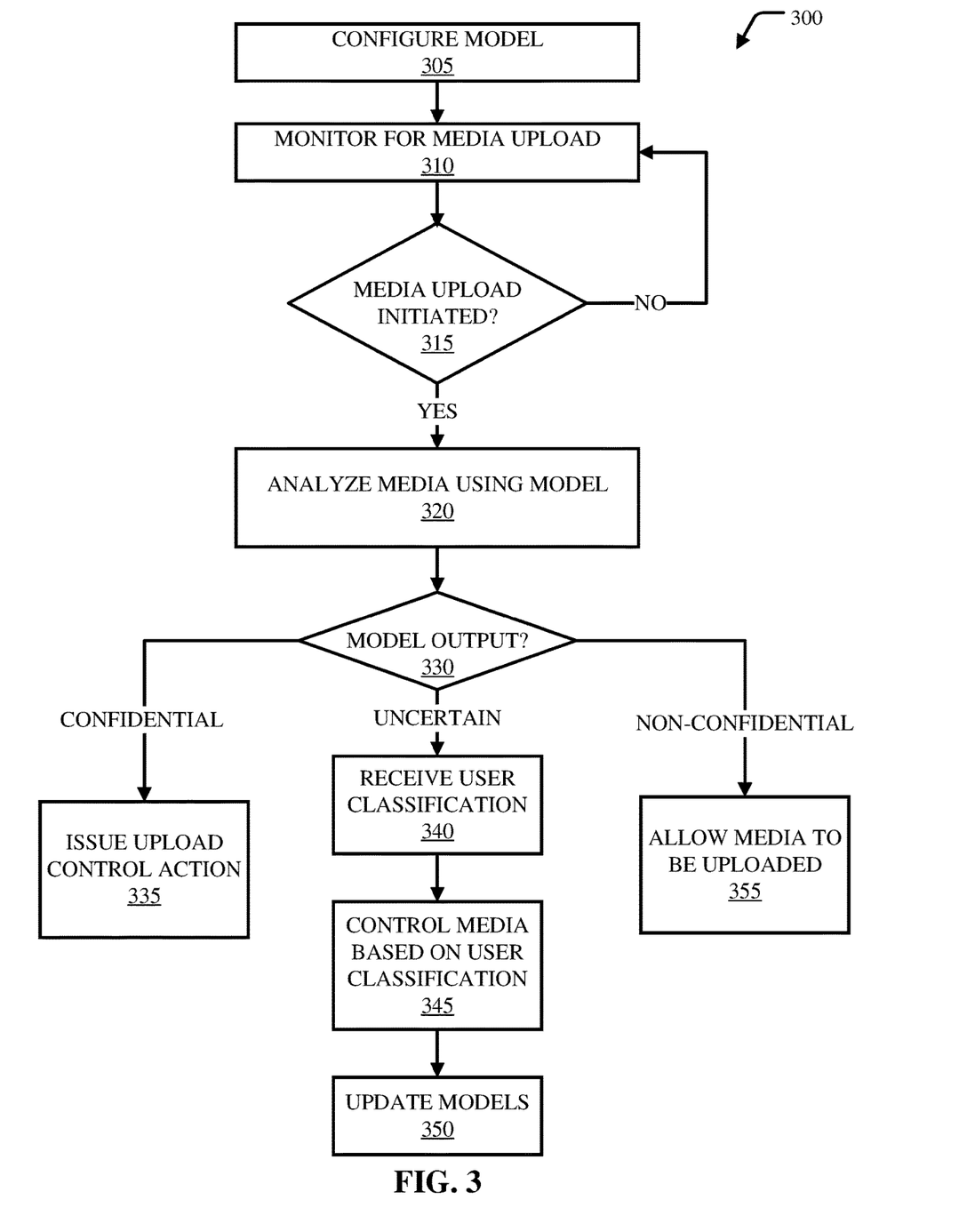
FIG. 3 is flow-diagram illustrating an example method for managing media items uploaded to cloud storage, in accordance with embodiments of the present disclosure.

FIG. 3 is a flow diagram illustrating an example method 300 for managing the upload of media items to cloud storage, in accordance with embodiments of the present disclosure. Method 300 initiates at operation 305, where a model is configured to classify media items as confidential or non-confidential. The classification model can be trained, programmed, or otherwise configured in the same, or a substantially similar, manner as described with respect to the models 245 of FIG. 2. For example, a supervised machine learning model can be trained using media content pre-classified as confidential and non-confidential.

Media item uploads are then monitored. This is illustrated at operation 310. In some embodiments, obtaining a media item (e.g., at a user device) can indicate that a media item will be uploaded, as some devices automatically back-up media items to the cloud upon receipt. In some embodiments, uploads can be monitored based on actions taken on the media item, such as data transfer requests, back-up requests, data modification (e.g., editing a media item), or other actions that can trigger storage to cloud storage resources. A determination is made whether a media item upload is initiated. This is illustrated at operation 315. If no media item uploads are initiated, then method 300 returns to operation 310, where media item uploads are monitored. As such, method 300 can continually loop between operations 310 and 315 until a media item upload is initiated.

If a media item upload has initiated (e.g., an indication that a media item will be uploaded to cloud storage is determined), then the media item is analyzed using the model configured at operation 305. This is illustrated at operation 320. The media item can be analyzed using the same, or substantially similar, techniques as described with respect to the media item analyzer 240 of FIG. 2. For example, the media item can be analyzed using a supervised machine learning model configured to classify confidentiality status, the media item can be analyzed based on features extracted from or identified within the media item, the media item can be analyzed based on a location that the media item was obtained from, etc. In embodiments, multiple factors can be simultaneously considered when analyzing the media item.

A determination is made whether the output of the model is confidential, non-confidential, or uncertain. This is illustrated at operation 330. If the model outputs that the media item is confidential, then an issue control action can be issued. This is illustrated at operation 335. The issue control actions can include those described with respect to the upload controller 267 of FIG. 2. For example, control actions can include warnings (e.g., a warning that the media item may contain sensitive information), upload confirmations (e.g., a query presented to the user asking whether the user wants to upload the media item based on the classification), upload preventions (e.g., blocking the media item from being uploaded to the cloud), review requests (e.g., transmitting the media item for administrative review based on the classification prior to upload), review confirmations (e.g., a query presented to the user asking whether the user wants to transmit the media item for administrative review), media item deletions (e.g., erasing the media item based on the classification), and media item deletion queries (e.g., a query presented to the user asking whether the user wants to delete the media item based on the classification).

If a determination is made that the media item is non-confidential, then the media item can be allowed to be uploaded to the cloud. This is illustrated at operation 355. In some embodiments, a notification can be transmitted to the user including the classification output by the system and an indication that the media item will be uploaded to cloud storage.

If a determination is made that the confidentiality of the media item is unable to be determined (e.g., "Uncertain"), then a user classification is received. This is illustrated at operation 340. The user classification can include an indication that the media item is either confidential or non-confidential. In some embodiments, the user feedback received at operation 340 can also include classifications of features detected within media items, such as object identities, string identities, etc. This can be used to more accurately detect features within media items in the future.

Based on the user classification, the media item is controlled. This is illustrated at operation 345. For example, if a confidential classification is assigned, the media item can be controlled the same as, or substantially similar to, operation 335. If a non-confidential classification is assigned, then the media item can be allowed to be uploaded to the cloud, similar to operation 355.

The models can then be updated based on the received feedback. This is illustrated at operation 350. Examples of updates that can occur to the model include: additional training data implemented into a supervised machine learning algorithm, additional classified locations, additional features that can be analyzed to ascertain a confidentiality status, modified feature weighting, reclassified locations, reclassified features, and others.

The aforementioned operations can be completed in any order and are not limited to those described. Additionally, some, all, or none of the aforementioned operations can be completed, while still remaining within the spirit and scope of the present disclosure.

Figure 4:
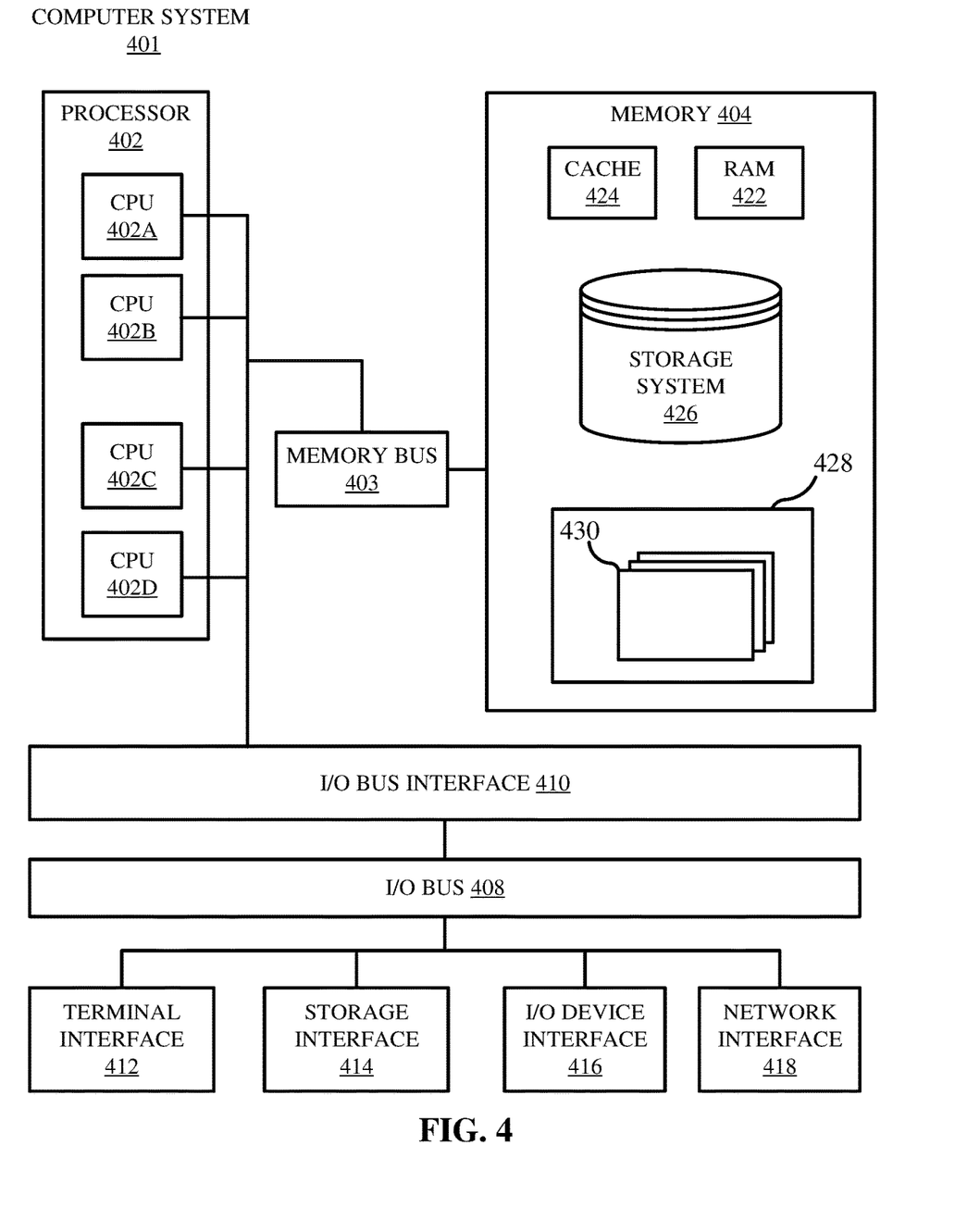
FIG. 4 is a high-level block diagram illustrating an example computer system that can be used in implementing one or more of the methods, tools, and modules, and any related functions described herein, in accordance with embodiments of the present disclosure.

Referring now to FIG. 4, shown is a high-level block diagram of an example computer system 401 that may possibly be utilized in various devices discussed herein (e.g., devices 105, server 135, user device 205, server 225) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

In some embodiments, the program modules 430 of the computer system 401 include an upload management module. The upload management module can be configured to manage the upload of media items to cloud storage. The upload management module can include a model configured to distinguish between confidential and non-confidential media items. The upload management system can be configured to analyze a media item to be uploaded to a cloud storage using the model to determine whether the media item is confidential. In response to determining that the media item is confidential, the upload management system can be configured to issue an upload control action on the media item.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
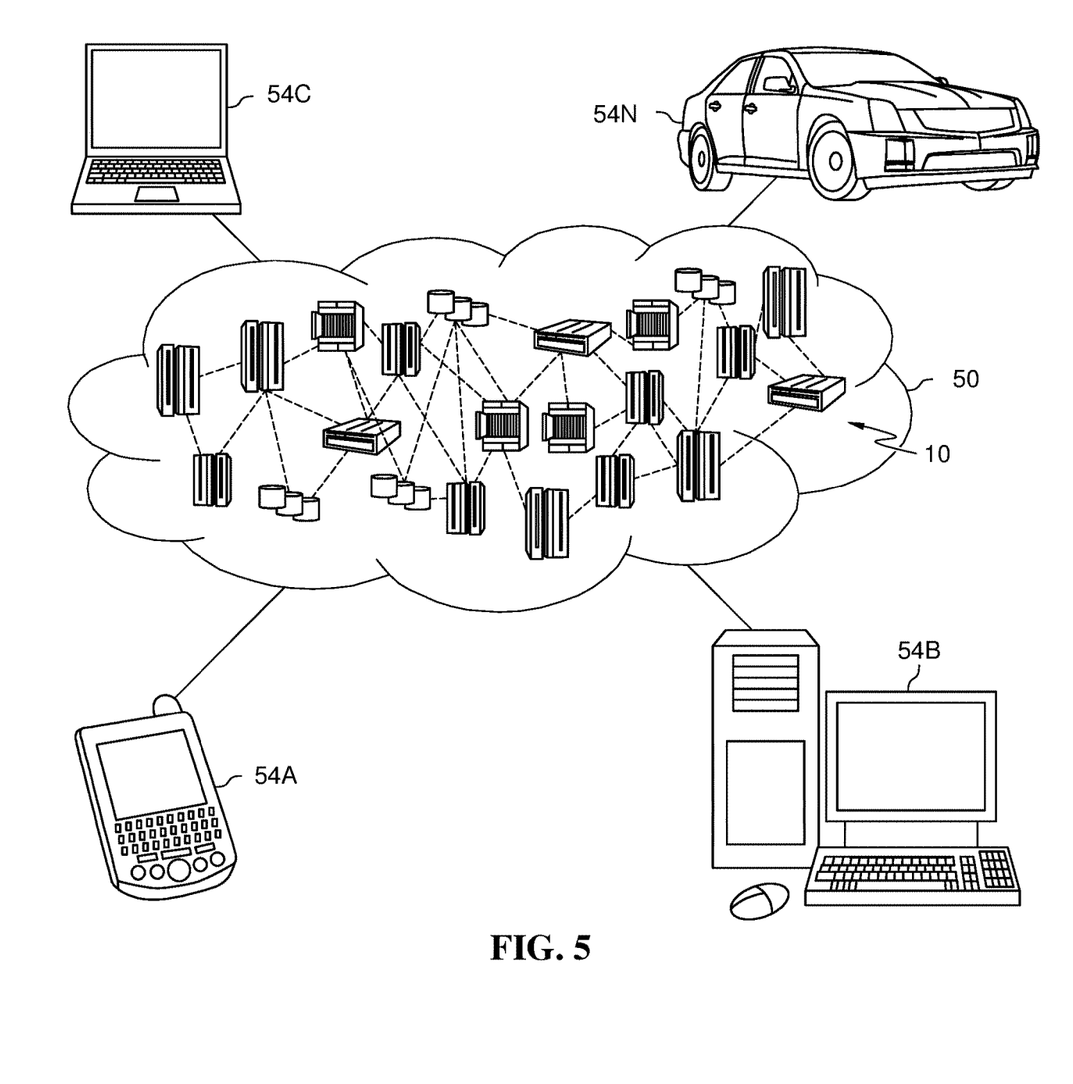
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105, device 205), desktop computer 54B (e.g., server 135, server 225), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
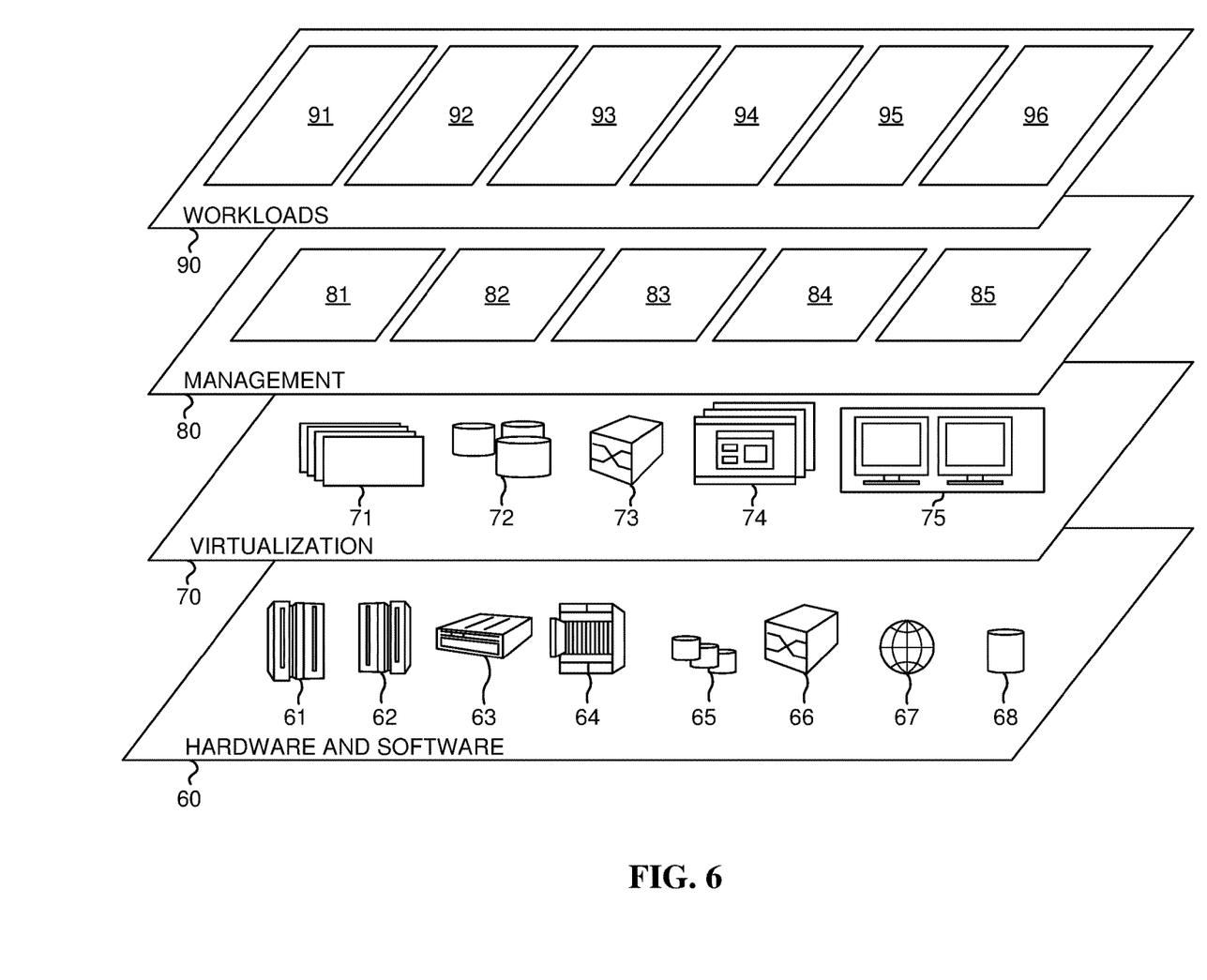
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and upload management 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   configuring a model to distinguish between confidential and non-confidential media items, wherein the model includes a supervised machine learning algorithm trained using media items pre-classified as confidential and non-confidential, wherein configuring the model further comprises:
      receiving a set of media items;
      receiving a first set of labels designating each media item of a first subset of the set of media items as confidential;
      receiving a second set of labels designating each media item of a second subset of the set of media items as non-confidential; and
      training the supervised machine learning algorithm based on the first set of labels designating each media item of the first subset as confidential and the second set of labels designating each media item of the second subset as non-confidential;
   analyzing, by an upload controller comprising a set of predetermined rules, a media item to be uploaded to a cloud storage using the model to determine whether the media item is confidential, wherein analyzing the media item includes:
      inputting the media item into the supervised machine learning algorithm;
      receiving, from the supervised machine learning algorithm, a probabilistic confidentiality score for the media item based on a plurality of features of the media item; and
      comparing the probabilistic confidentiality score to a confidentiality threshold; and
   issuing, in response to determining that the probabilistic confidentiality score for the media item does not satisfy the confidentiality threshold and in response to determining that a location the media item was obtained originates from a geofence designating a confidential location, an upload control action on the media item.

2. The method of claim 1, wherein the model includes a blocklist of objects, wherein the media item is an image, wherein analyzing the media item includes performing object recognition on the image to identify one or more objects within the image, wherein the upload control action is issued in response to identifying an object on the blocklist within the image.

3. The method of claim 1, further comprising:
   analyzing a second media item to be uploaded to the cloud storage using the model to determine whether the second media item is confidential; and
   permitting, in response to determining that the second media item is non-confidential, upload of the second media item to the cloud storage.

4. The method of claim 1, wherein the model includes a blocklist of objects, wherein the media item is an image, wherein analyzing the media item includes performing object recognition on the image to identify one or more objects within the image, wherein the upload control action is issued in response to identifying an object on the blocklist within the image.

5. The method of claim 1, wherein the confidential score is calculated by adding a set of weighted confidentiality factors.

6. A system comprising:
   a memory storing program instructions; and
   a processor, wherein the processor is configured to execute the program instructions to perform a method comprising:
   configuring a model to distinguish between confidential and non-confidential media items, wherein the model includes a supervised machine learning algorithm trained using media items pre-classified as confidential and non-confidential, wherein configuring the model further comprises:
      receiving a set of media items;
      receiving a first set of labels designating each media item of a first subset of the set of media items as confidential;
      receiving a second set of labels designating each media item of a second subset of the set of media items as non-confidential; and
      training the supervised machine learning algorithm based on the first set of labels designating each media item of the first subset as confidential and the second set of labels designating each media item of the second subset as non-confidential;
   analyzing, by an upload controller comprising a set of predetermined rules, a media item to be uploaded to a cloud storage using the model to determine whether the media item is confidential, wherein analyzing the media item includes:
      inputting the media item into the supervised machine learning algorithm;
      receiving, from the supervised machine learning algorithm, a probabilistic confidentiality score for the media item based on a plurality of features of the media item; and
      comparing the probabilistic confidentiality score to a confidentiality threshold; and
   issuing, in response to determining that the probabilistic confidentiality score for the media item does not satisfy the confidentiality threshold and in response to determining that a location the media item was obtained originates from a geofence designating a confidential location, an upload control action on the media item.

7. The system of claim 6, wherein the confidentiality score is calculated by adding a set of weighted confidentiality factors.

8. The system of claim 7, wherein the set of weighted confidentiality factors includes a first weighted confidentiality factor obtained by the supervised machine learning algorithm, a second weighted confidentiality factor obtained based on features extracted from the media item, and a third weighted confidentiality factor obtained based on the location the media item was received from.

9. The system of claim 6, wherein the method performed by the processor further comprises:
   analyzing a second media item to be uploaded to the cloud storage using the model to determine whether the second media item is confidential; and
   permitting, in response to determining that the second media item is non-confidential, upload of the second media item to the cloud storage.

10. The system of claim 9, wherein the model includes an allowlist of objects, wherein the second media item is an image, wherein analyzing the second media item includes performing object recognition on the image to identify one or more objects within the image, wherein the second media item is determined to be non-confidential based on identifying an object present on the allowlist within the image.

11. A computer program product comprising a computer readable storage medium having program instructions embodied therewith, the program instructions executable by a processor to cause the processor to perform a method comprising:
   configuring a model to distinguish between confidential and non-confidential media items, wherein the model includes a supervised machine learning algorithm trained using media items pre-classified as confidential and non-confidential, wherein configuring the model further comprises:
   receiving a set of media items;
   receiving a first set of labels designating each media item of a first subset of the set of media items as confidential;
   receiving a second set of labels designating each media item of a second subset of the set of media items as non-confidential; and
   training the supervised machine learning algorithm based on the first set of labels designating each media item of the first subset as confidential and the second set of labels designating each media item of the second subset as non-confidential;
   analyzing, by an upload controller comprising a set of predetermined rules, a media item to be uploaded to a cloud storage using the model to determine whether the image is confidential, wherein analyzing the image includes:
   inputting the media item into the supervised machine learning algorithm;
   receiving, from the supervised machine learning algorithm, a probabilistic confidentiality score for the media item based on a plurality of features of the media item; and
   comparing the probabilistic confidentiality score to a confidentiality threshold; and
   issuing, in response to determining that the probabilistic confidentiality score for the media item does not satisfy the confidentiality threshold and in response to determining that a location the media item was obtained originates from a geofence designating a confidential location, an upload control action on the media item.

12. The computer program product of claim 11, wherein the upload control action includes redacting the media item.

13. The computer program product of claim 11, wherein the model includes a blocklist of strings, wherein a second media item analyzed by the model is a text document, wherein analyzing the second media item using the model includes performing string searching on the text document to identify one or more strings within the text document, wherein a second upload control action is issued on the second media item in response to identifying a string on the blocklist within the text document.

14. The computer program product of claim 11, wherein the model includes a blocklist of objects, wherein the blocklist of objects designates objects which are confidential, wherein the media item is an image, wherein analyzing the image in includes:
   performing a region based convolutional neural network (R-CNN) object recognition algorithm on the image to identify one or more objects within the image, wherein the output of the R-CNN object recognition algorithm includes a plurality of objects and corresponding labels that were identified in the image;
   comparing each of the plurality of objects and corresponding labels to the blocklist of objects to determine whether the image includes any objects designated as confidential; and
   issuing, in response to determining that the location where the image was obtained originates from a geofence designating a confidential location and in response to identifying an object on the blocklist within the image, an upload control action on the image.

* * * * *